United States Patent [19]

Bahn

[11] Patent Number: 5,319,297
[45] Date of Patent: Jun. 7, 1994

[54] DRIVING SYSTEM FOR RELUCTANCE TYPE MOTOR

[75] Inventor: Itsuki Bahn, Shibuya, Japan
[73] Assignee: Kabushikigaisya Sekogiken, Tokyo, Japan
[21] Appl. No.: 849,396
[22] PCT Filed: Aug. 28, 1991
[86] PCT No.: PCT/JP91/01145
   § 371 Date: Apr. 28, 1992
   § 102(e) Date: Apr. 28, 1992
[87] PCT Pub. No.: WO92/03872
   PCT Pub. Date: Mar. 5, 1992

[30] Foreign Application Priority Data

Aug. 28, 1990 [JP] Japan .................................. 224391

[51] Int. Cl.⁵ .............................................. H02P 7/36
[52] U.S. Cl. .............................................. 318/701
[58] Field of Search .................. 318/701, 254, 439, 696

[56] References Cited

U.S. PATENT DOCUMENTS

| | | | |
|---|---|---|---|
| 3,911,339 | 10/1975 | Rettig | 318/701 |
| 4,371,817 | 2/1983 | Müller | 318/254 |
| 4,739,240 | 4/1988 | MacMinn et al. | |
| 4,746,843 | 5/1988 | Taenzer | 318/254 |
| 4,837,493 | 6/1989 | Maeno et al. | 318/696 |
| 4,868,477 | 9/1989 | Anderson et al. | |
| 4,943,760 | 7/1990 | Byrne et al. | 318/701 |
| 5,138,244 | 8/1992 | Bahn | 318/701 |

FOREIGN PATENT DOCUMENTS 5794816  6/1982  Japan.
2272851 11/1987  Japan.

Primary Examiner—William M. Shoop, Jr.
Assistant Examiner—John W. Cabeca
Attorney, Agent, or Firm—Staas & Halsey

[57] ABSTRACT

This driving system can reduce ripple components included in the output torque of reluctance type motors. During a driving operation of a motor (3), a data selecting readout unit (51) decodes an output of an A/D converter (18a) which corresponds to a command exciting current value fed from a supply current control circuit, and selects one of memories (51a to 51e) corresponding to the command exciting current value. Further the torque ripple data from the selected memory is successively read out in accordance with an address output of an address counter (57) that is renewed every time a shaft encoder (6) sends out an output and, in turn, supplies it through a D/A converter (59) to the current supply control circuit (61). The current supply control circuit corrects the command exciting current based on the torque ripple data, and controls actuation of the motor by the corrected command exciting current to remove the torque ripple in the motor output torque.

15 Claims, 9 Drawing Sheets

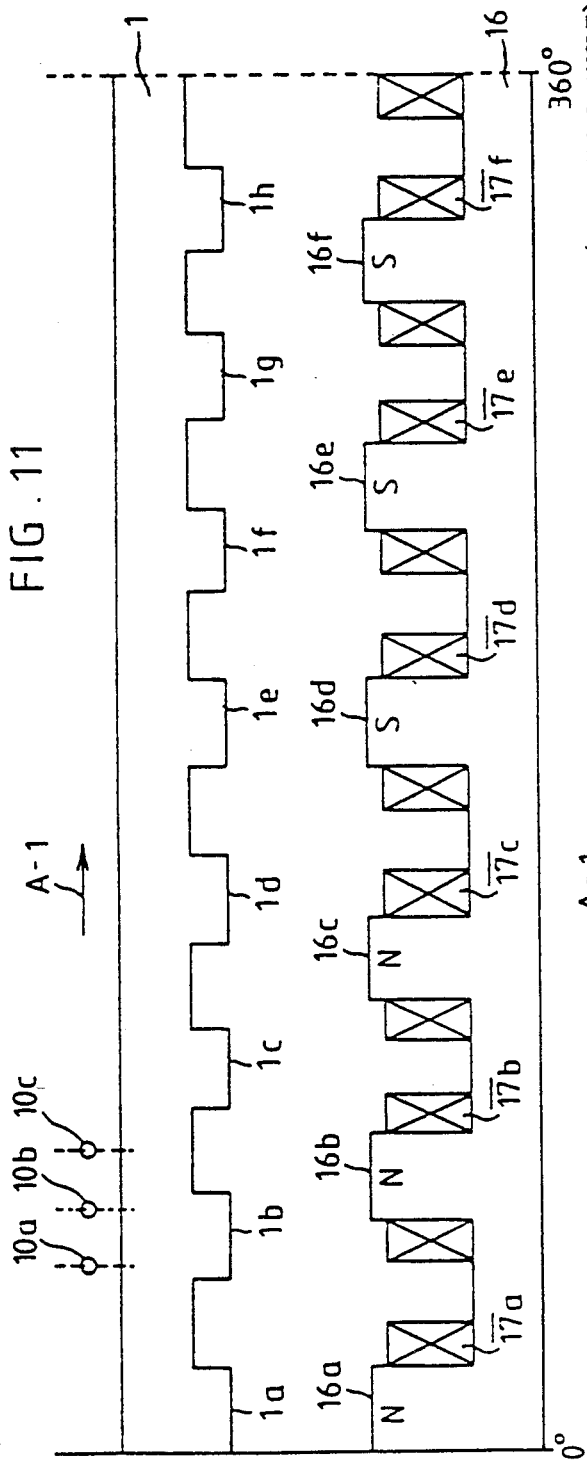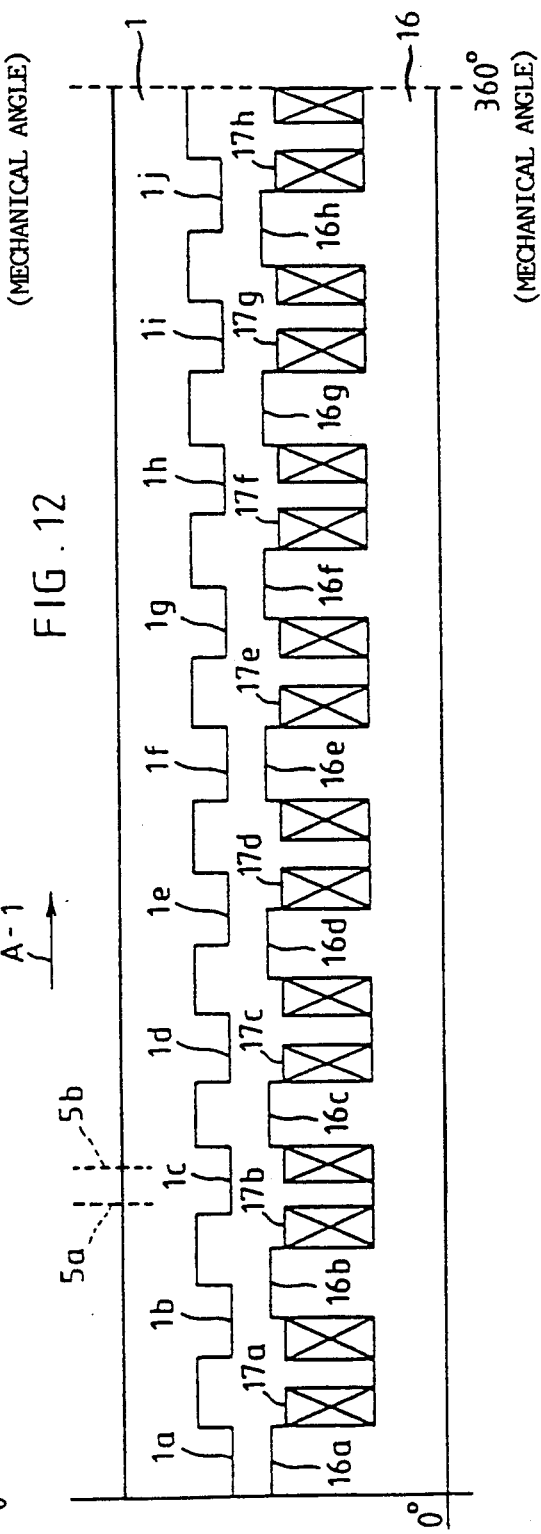

DRIVING SYSTEM FOR RELUCTANCE TYPE MOTOR

BACKGROUND OF THE INVENTION

1. Field of the Invention

The present invention relates to a driving system for a reluctance type motor, particularly to a driving system capable of removing torque ripple components included in output torque of the reluctance type motor preferable for use as driving sources for various apparatus.

2. Description of the Prior Art

There has been known a reluctance type motor which comprises a stator having a plurality of magnetic poles and a rotor having a plurality of salient-poles and causes the rotor to rotate by magnetic attraction interacting between sequentially excited magnetic poles of said stator and corresponding salient-poles of said rotor facing the excited magnetic poles. The reluctance type motor has advantages such as remarkably large output torque, good efficiency, and inexpensive cost, but to the contrary, has a disadvantage such as limited application due to its large torque ripples. That is, in the reluctance type motor, remarkably large torque is generated shortly after salient-poles begin to face the magnetic poles. On the other hand, the torque becomes small just before the salient-poles completely face the magnetic poles.

Accordingly, output torque is generated with ripple components. And further, as exciting current increases, a curve representing the relationship between torque and rotor rotational angle increases its height as well as generating a point of its peak value advanced earlier. Therefore, conventional reluctance type motors cannot be used as driving sources for precise servo-motors etc. which need to satisfy the requirement that the torque ripple must be limited to less than a few % of the output torque under the condition that the reluctance type motor is driven with less than 30% of the rated output torque.

For removing torque ripples in a DC-motor with a magnetic rotor, there is known a technology that changes the exciting current in accordance with the rotational angle of the rotor (for example, refer to Japanese Unexamined Patent Application No. SHO 55-44555). According to this proposed technology, a curve representing the relationship between the torque and the rotor rotational angle for the DC-motor becomes flat and therefore torque ripple can be removed. That is, the torque-rotational angle curve merely varies in a similar way in response to the increase and decrease of the exciting current in a DC-motor. However, in reluctance type motors, this torque-rotational angle curve varies in a complicated way in response to the increase and decrease of the exciting current. Therefore, it is difficult to obtain a flat torque characteristic by removing torque ripples

SUMMARY OF INVENTION

The purpose of the present invention is to provide a driving system capable of reducing torque ripples occuring in the output torque of reluctance type motors.

To accomplish the above purpose, according to one aspect of the present invention, a driving system for controlling actuation of a reluctance type motor with a rotor and an armature having exciting coils comprises a position detecting device generating a position detecting signal representing an actual rotational position of the rotor, a memory device pre-memorizing torque ripple data as a function of a command exciting current and a rotor rotational position, and a supply current control circuit for supplying to each exciting coil an exciting current corresponding to a command exciting current corrected by the torque ripple data read out from the memory device on the basis of the position detecting signal and the command exciting current.

Further, in accordance with a second aspect of the present invention, a driving system for controlling actuation of a reluctance type motor with a rotor and an armature having exciting coils comprises a position detecting device generating a position detecting signal representing an actual rotational position of the rotor, a rotational body disposed synchronously rotatable together with the rotor and having an outer peripheral surface comprising a plurality of axial regions each having physical values respectively corresponding to torque ripple data as a function of a corresponding one of a plurality of command exciting current values and a rotor rotational position, a physical value detector having a detecting portion shiftable along an axial direction of the rotational body so as to be able to face any one of the plurality of axial regions on the outer peripheral surface of the rotational body, a servo device for positioning the detecting portion so that the detecting portion faces one of the plurality of axial regions on the outer peripheral surface of the rotational body which corresponds to the command exciting current, and a current supply control circuit for supplying to each exciting coil an exciting current corresponding to a command exciting current corrected by the torque ripple data corresponding to a physical value detected by the physical value detector to which the detecting portion is thus positioned.

As shown above, in accordance with the present invention, the torque ripple data, defined as a function of the command exciting current and the rotor rotational position, is read out based on the command exciting current and the rotor rotational position. Or, a physical value on the rotor outer peripheral surface, which is a function of the command exciting current and the rotor rotational position and corresponds to the torque ripple data, is detected by the physical value detector having a detecting portion disposed to face one of the plurality of axial regions on the outer peripheral surface of the rotational body which corresponds to the command exciting current. Subsequently, the command exciting current is corrected by the torque ripple data read out from the memory device or the physical value detected by the physical value detector, and the exciting current corresponding to the corrected command exciting current is supplied to each exciting coil.

In this manner, if the reluctance type motor is driven by the exciting current corresponding to the corrected command exciting current based on the torque ripple data or the physical value corresponding to this torque ripple data, it is possible to suppress or remove the torque ripple produced when the motor is driven by the command exciting current. Accordingly, it becomes possible to provide a reluctance type motor capable of being preferably used as a driving source for various apparatus such as a precise servo-apparatus.

BRIEF DESCRIPTION OF DRAWINGS

FIG. 11 is a development showing a rotor and an armature of a three-phase half-wave reluctance type motor used together with a driving system in accordance with a second embodiment of the present invention;

FIG. 12 is a development showing a rotor and an armature of a two-phase reluctance type motor used together with a driving system in accordance with a third embodiment of the present invention;

DESCRIPTION OF THE PREFERRED EMBODIMENTS

Hereinafter, referring now to FIGS. 1 to 10, explained in detail is the driving system of the first embodiment of the present invention which is used as the driving control for reluctance type motors.

Figure 1:
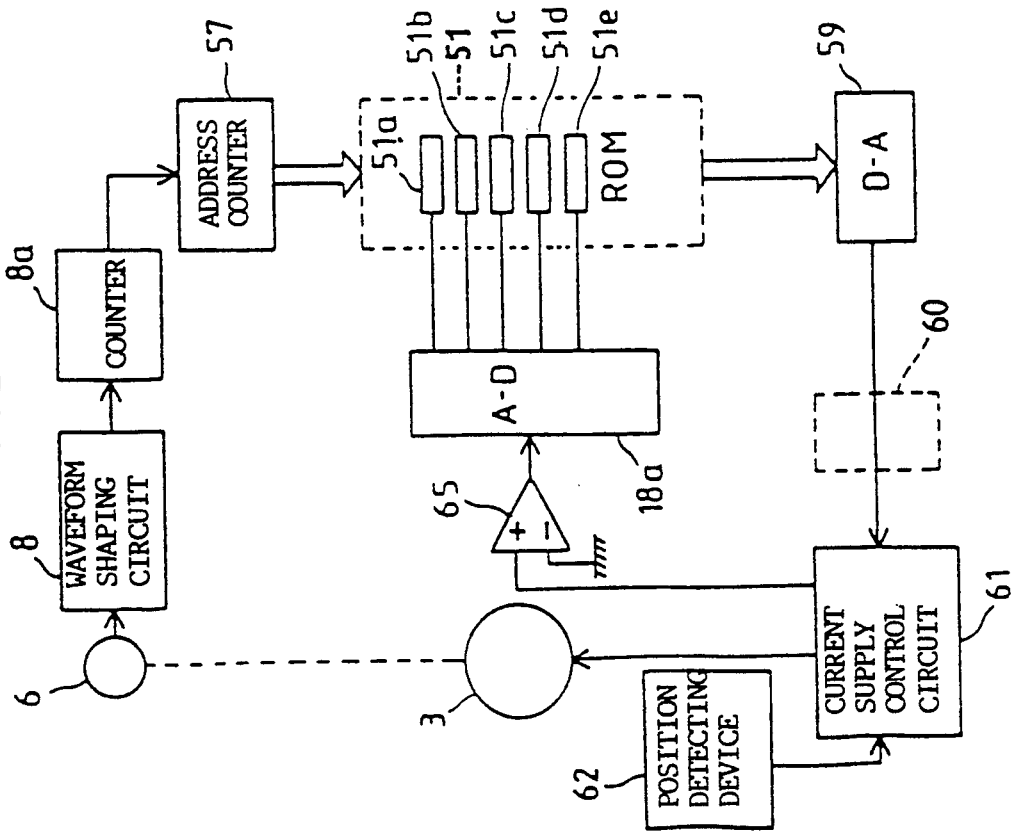
FIG. 1 is a schematic block diagram showing an essential part of a driving system for driving a reluctance type motor in accordance with a first embodiment of the present invention.

Referring to FIG. 1, the driving system comprises a current supply control circuit 61 which is explained in detail later, a position detecting device 62, explained in detail later, which generates a position detecting signal to be fed to the current supply control circuit 61, a shaft encoder 6 installed on a rotational shaft of the motor 3 for generating a pulse sign having a frequency proportional to a rotational speed of the motor 3, a waveform shaping circuit 8 connected to an output terminal of the shaft encoder 6, a counter circuit 8a inputting the waveform-shaped position detecting pulse signal and an address counter 57 generating address outputs corresponding to the count value of the counter circuit 8a.

Further, the driving system comprises an operational amplifier 65 inputting a command exciting current fed from the current supply control circuit 61, an A/D converter 18a converting the analogue output of the operational amplifier 65 into a digital signal, a plurality of read only memories (ROM) 51a to 51e respectively storing a plurality of sets of torque ripple data each corresponding to a plurality of command exciting current values, a data selecting readout unit 51 which decodes the digital output of the A/D converter 18a to select a corresponding one of the ROMs 51a to 51e and reads out data from the selected ROM according to the address output, and a D/A converter 59 converting the digital data fed from the ROM 51a, 51b,-or 51e into analogue data.

Each of the ROM 51a to 51e stores torque ripple data corresponding to each of a plurality of rotor rotational positions at the command exciting current value corresponding to each ROM. The torque ripple data is stored in advance, for example, before shipment of the driving system, by using the torque ripple data writing device of FIG. 2 while the motor 3 is supplied with the exciting current in from a DC source (not shown) to drive the motor 3.

In FIG. 1, a reference numeral 60 denotes a component of a modified example of the first embodiment (described later).

Figure 2:
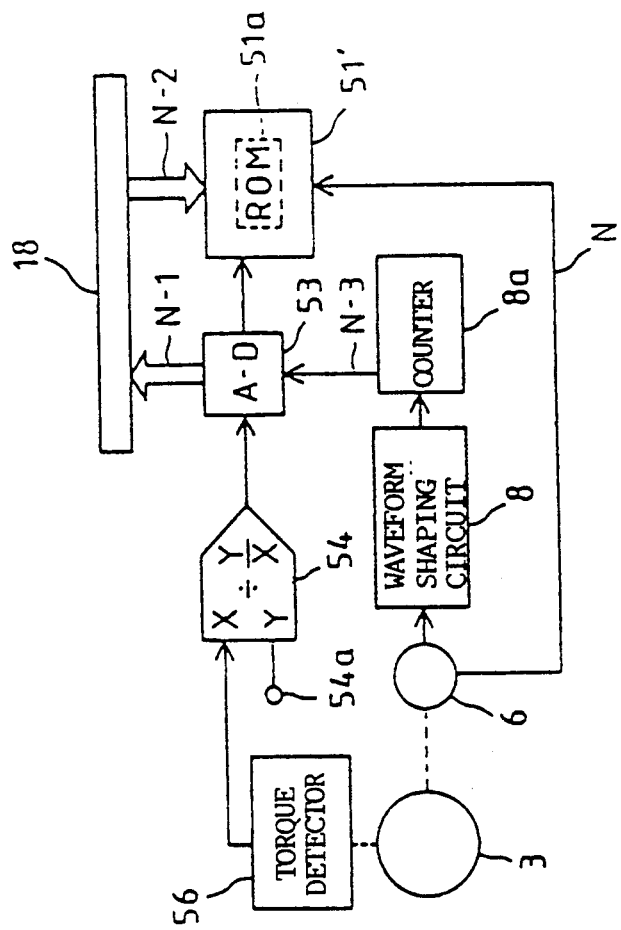
FIG. 2 is a schematic block diagram showing a torque ripple data writing device used for storing the torque ripple data in the memory of FIG. 1.

Referring to FIG. 2, the data writing device comprises a torque detector 56 which is connected to the rotational shaft of the motor 3 and generates, when the motor 3 is driven by the exciting current In, an analogue voltage representing a motor output torque Tn (=fn(i) In) as a function of the rotor rotational position i of the motor 3 and the exciting current In. The output torque Tn includes ripple torques corresponding to the function fn(i). Further, the data writing device comprises a division circuit 54 which has an input terminal X for inputting output of the torque detector and an input terminal Y for inputting through a terminal 54a an analogue voltage KIn (a reference symbol K represents a constant value) proportional to the exciting current In and generates an analogue output Fn(i) (=K / fn(i)) relating to the torque ripple, an A/D converter 53 converting the output Fn(i) of the division circuit into a digital data 44a (FIG. 3), and a programmable read only memory (P-ROM) writer circuit 51' for writing digital data into each of the ROMs 51a to 51e.

The A/D converter 53 is constituted formed such that when a synchronizing signal 43a (FIG. 3), which is generated by the counter 8a every time a predetermined number of output pulses fed from the shaft encoder 6 are inputted through the waveform shaping circuit 8, is inputted through a lead line N-3, the A/D converter 53 converts the output Fn(i) of the division circuit at this time into a digital data 44a and generates a memory writing signal 46a after finishing the conversion.

The P-ROM writer circuit 51' inputs the digital data 44a, which is sent out through the lead line N-1 on the data bus 18, through the lead line N-2, and writes it into a ROM accommodated inside thereof such as a ROM 51, and further inputs through a lead line N an origin point signal of the shaft encoder 6 generated every complete revolution of the rotor as a reset signal 11a or 11b (FIG. 3) so as to initiate or terminate the data writing.

Figure 3:
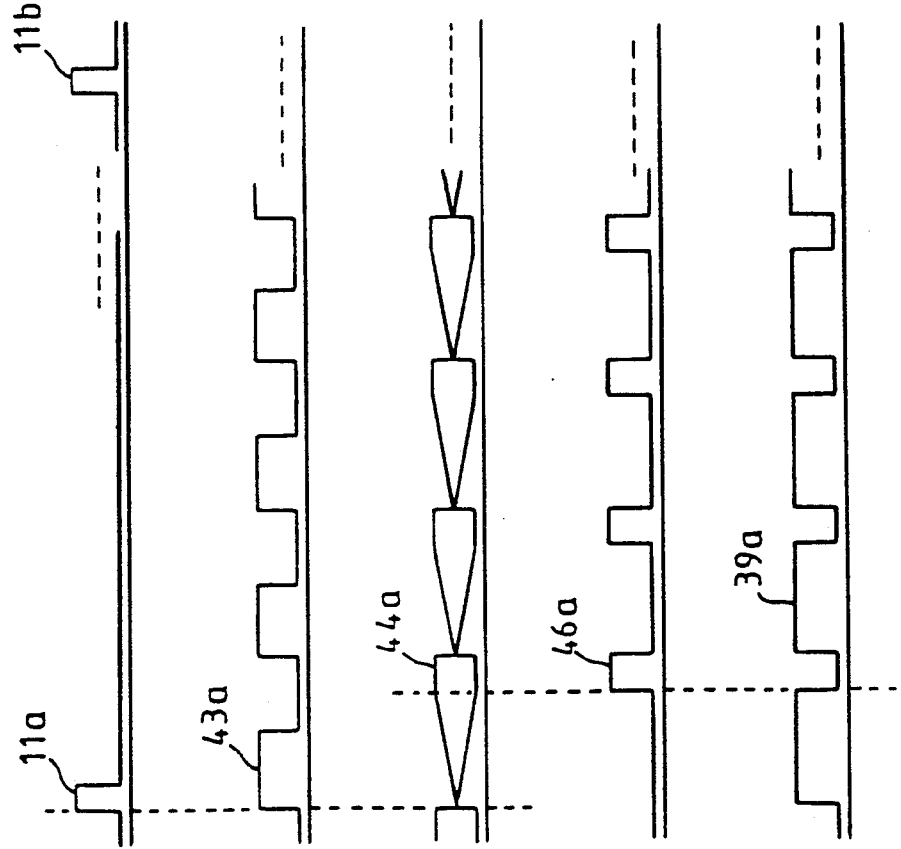
FIG. 3 is a timing chart explaining an operation of the torque ripple data writing device.

Hereinafter, referring now to FIG. 3, the storage of torque ripple data into the ROM 51a will be explained.

The shaft encoder 6 sends out a reset signal 11a when the rotor of the motor 3 reaches a predetermined rotational position while the motor 3 is driven by the exciting current In such as 1.6 ampere belonging to the exciting current range within which the motor 3 outputs a torque less than half of a rated output torque of the motor 3. The P-ROM writer circuit 51' sets the data writing address to "1" in response to the reset signal 11a. Subsequently, the position detecting pulse signal is fed from the shaft encoder 6 through the waveform shaping circuit 8 to the counter 8a in accordance with rotation of the rotor.

The counter 8a applies the synchronizing signal 43a through the lead line N-3 to the A/D converter 53 every time a predetermined number of pulses are counted. At the timing of respective rising points of the synchronizing signal 43a, the A/D converter 53 initiates the conversion of the analogue output Fn(i) of the division circuit 54 into digital data 44a and serially outputs a predetermined bit number of digital data 44a through the lead line N-1 onto the data bus 18. In accordance with the memory writing signal 46a generated by the A/D converter 53, when the sending out of digital data 44a is finished, the P-ROM writer circuit 51' inputs the digital data 44a through the lead line N-2, and writes the digital data into the first address of the ROM 51a and, in turn, generates an address renewing signal 39a renewing the data writing address.

If the next synchronizing signal 43a is generated, a digital data 44a corresponding to the rotor rotational position at this time is written in the second address of the ROM 51a. In a similar way, the digital data 44a is written in the ROM 51a every time the synchronizing signal 43a is generated. And, when the next reset signal 11b is generated after one complete revolution of the rotor, the procedure of writing the data into the ROM 51a is finished. By this data writing processing, digital data corresponding to each of a plurality of rotor rotational positions during one complete revolution of the motor 3 are stored in the ROM 51a.

Next, by successively changing the exciting current value In applied to the motor 3 within the exciting current range which generates torque less than half of the rated output torque of motor 3, the digital data are inputted into the ROMs 51b to 51e in the same way. Moreover, the generating interval of the synchronizing signal 43a and the setting interval of the exciting current value should be selected to establish accuracies required in operation of motors in the apparatus (for example a servo apparatus) to which a driving system equipped with a motor is installed and to decrease the ROM memory capacity required for memorizing digital data and the number of ROM to be disposed.

Next, the operation of the driving system of FIG. 1 will be explained. However, explanation of operations for the supply current control circuit 61 and the position detecting device 62 is omitted here since it is explained in detail later.

When the motor 3 is driven to rotate under the control of the current supply control circuit 61, the A/D converter 18a converts an analogue command exciting current value In inputted through the operational amplifier from the supply current control circuit 61 into a digital signal. On the other hand, the data selecting readout unit 51 decodes the output of the A/D converter and selects one of the ROMs 51a to 51e, for example, ROM 51a, which corresponds to the command exciting current value In.

Every time the shaft encoder 6 generates the origin point signal after one complete revolution of the rotor of the motor 3 during its operation, the address counter 57 is reset. Further, every time the output pulse is outputted from the shaft encoder 6 after generation of the origin point signal, an address output of the address counter 57 is renewed. Then, the torque ripple data Fn(i) stored in each of the addresses successively designated by the address output is successively read out from the ROM 51a under the control of the unit 51 and, subsequently, is converted into an analogue data in the D/A converter 59 and further supplied to the current supply control circuit 61.

As described in detail later, the current supply control circuit 61 corrects the command exciting current In by using the torque ripple data Fn(i) and controls the actuation of the motor 3 based on the corrected command exciting current. As a result of this control procedure, ripple components of the output torque of the motor are suppressed or removed.

Figure 4:
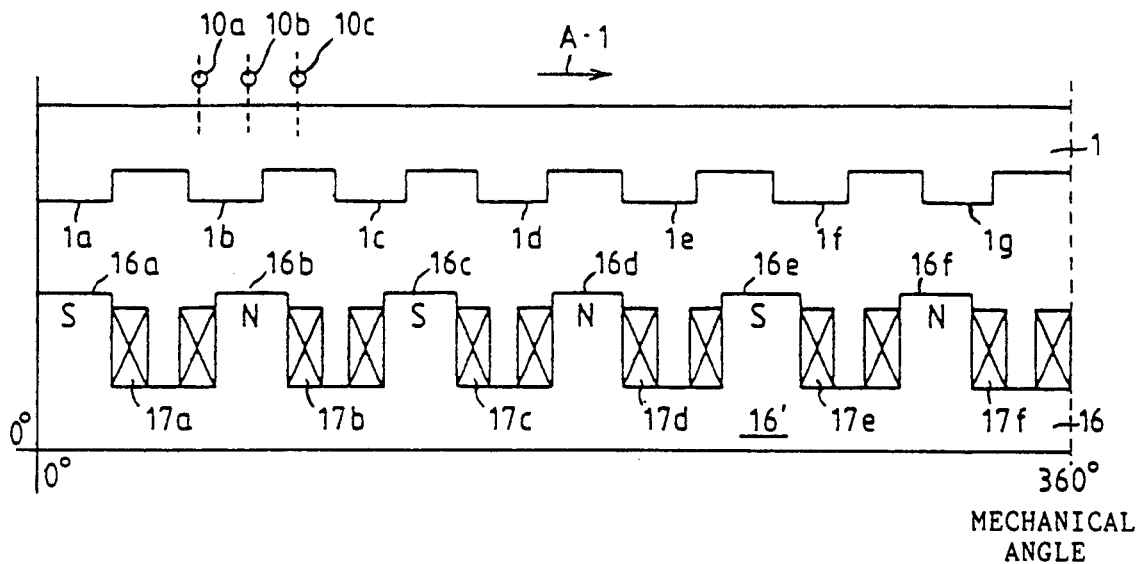
FIG. 4 is a graph showing a rotor and an armature of a three-phase full-wave reluctance type motor.
Figure 7:
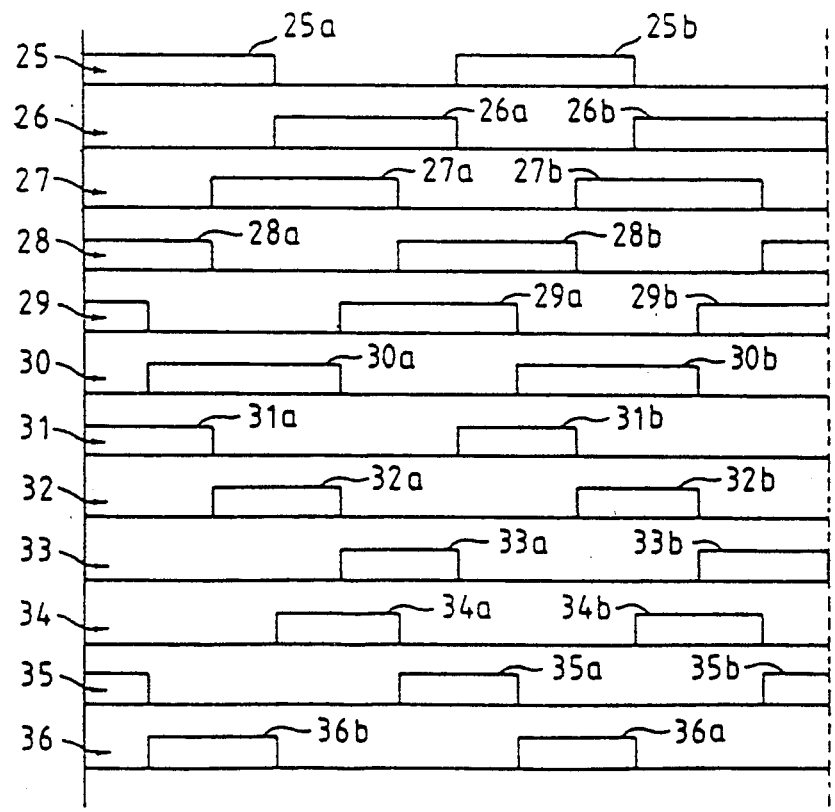
FIG. 7 is a timing chart showing rectangular wave signals and position detecting signals generated from the position detecting device.

The motor 3 used in accordance with the present embodiment is a three-phase full-wave reluctance type motor and, as shown in the diagram in FIG. 4 comprises a rotor 1 fixed on a rotational shaft rotatably supported at both ends on a motor outer body (not shown) and an armature (i.e., a stator) 16 fixed on the motor outer body disposed coaxially with the rotor 1, both being made of a well-known lamination layer of a silicon steel sheet. On outer peripheral surface of the rotor 1, seven salient-poles 1a to 1g each having a 180-degree electrical angle (hereinafter, various angular parameters are shown as values defined by electrical angle) are formed at regular intervals in a circumferential direction with a 360-degree phase difference. Moreover, the armature 16 has a circular magnetic core 16' freely forming a magnetic path, and six magnetic poles 16a to 16f each having a 180-degree width formed at regular intervals in a circumferential direction on an inner peripheral surface of the magnetic core. The magnetic poles 16a to 16f are respectively coupled with the exciting coils 17a to 17f.

Figure 5:
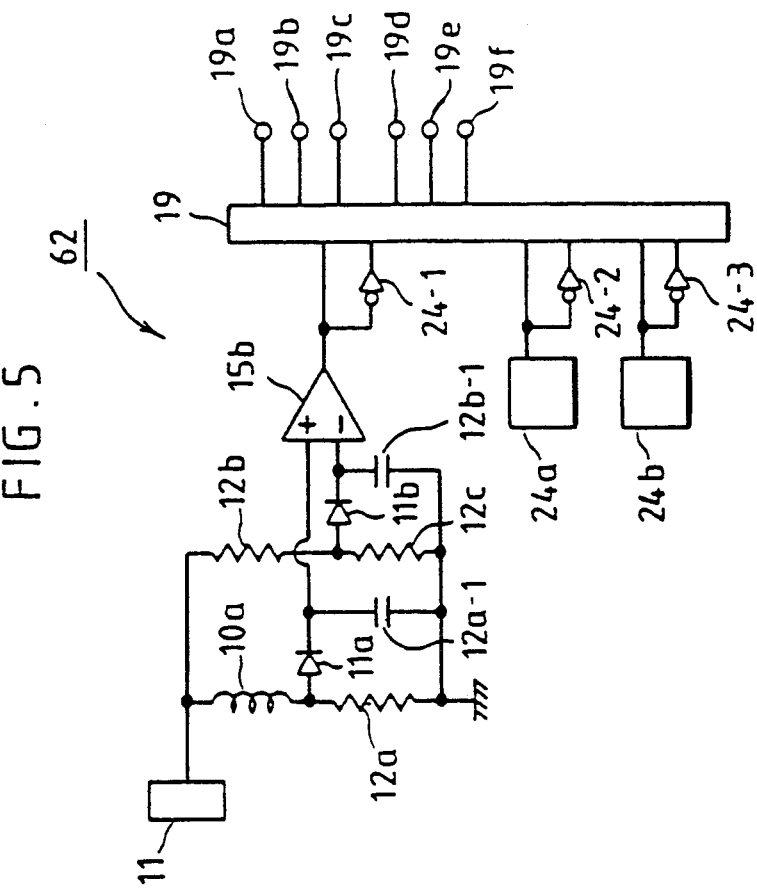
FIG. 5 is a block circuit diagram of a position detecting device shown in FIG. 1.

As shown in FIG. 5, the position detecting device 62 includes three detecting coils 10a to 10c (FIG. 4) each consisting of an air-core coil of approximately 100 turns having a 5 mm diameter for detecting rotational positions of salient-poles 1a to 1g of the rotor 1. These detecting coils are respectively spaced by 120 degrees with each other, and respective coil surfaces are fixed on the armature 16 so as to face the side surfaces of the salient-poles 1a to 1h maintaining a gap. Furthermore, the position detecting device 62 includes an oscillator 11 having an oscillation frequency of approximately 1 MHz and a bridge circuit relating to each of the detecting coils 10a to 10c.

The bridge circuit relating to the detecting coil 10a consists of the detecting coil 10a and resistances 12a to 12c, and is adjusted to balance in a condition that the detecting coil 10a does not face any of the salient-poles 1a to 1g. This bridge circuit is connected to two low-pass filters with diodes 11a and 11b and capacitors 12a-1 and 12b-1, an operational amplifier 15b, and a logic circuit 19. The logic circuit 19 consists of a conventional circuit used as a control circuit for three-phase Y-type semiconductor motors, and has six output terminals 19a to 19f. In more detail, the diode 11a has an anode connected to the connecting point o the coil 10a and the resistance 12a, and has a cathode connected to both the other end of the capacitor 12a-1 with one end grounded and the positive input terminal of the operational amplifier 15b. On the other hand, the diode 11b has an anode connected to the connecting point of the resistance 12b and 12c and has a cathode connected to the other end of the capacitor 12b-1 with one end grounded and the negative input terminal of the operational amplifier 15b. An output terminal of the operational amplifier 15b is connected to an input side of the logic circuit 19 and an input terminal of the inversion circuit 24-1 interposed therebetween.

In FIG. 5, reference numerals 24a and 24b denote circuits relating to coils 10b and 10c, respectively. Each of circuits 24a and 24b consist of circuit components corresponding to the bridge circuit relating to the coil 10a, the low-pass filter, and the operational amplifier and connected to the oscillator 11 commonly provided to three detecting coils. Reference numerals 24-2, 24-3 denote inversion circuits corresponding to the inversion circuit 24-1a.

As is described above, the bridge circuit is balanced in the condition that the detecting coils 10a to 10c do not face any of the salient-poles 1a to 1h of the rotor 1. Accordingly, when the detecting coil 10a does not face the salient-pole, the output from the low-pass filter consisting of the diode 11a and capacitor 12a-1 and the output from the low-pass filter consisting of the diode 11b and the capacitor 12b-1 are equal to each other, therefore, output of the operational amplifier 15b becomes the L level. However, as a matter of fact, when the motor is stopped, any one of the detecting coils faces any one of the salient-poles.

Accordingly, for example in the case that the detecting coil 10a faces any one of salient-poles, impedance of the detecting coil 10a decreases due to core loss (i.e., eddy current loss and hysteresis loss). Therefore, the voltage drop in the resistance 12a becomes large, and an applied voltage to the positive input terminal of the operational amplifier 15b increases to channel the output of the operational amplifier the H level as indicated by the reference numerals 25a, 25b in FIG. 7. That is, in accordance with the rotation of the rotor 1, a rectangular-wave signal 25 is output from the operational amplifier 15b. Also, a rectangular-wave signal 26 is output from the inversion circuit 24-1.

When each of the detecting coils 10b, and 10c faces to the side surface of any one of the salient-poles 1a to 1h, output signals from the operational amplifiers to blocks 24a and 24b become H levels (shown by reference numerals 27a, 27b, 29a and 29b). And, in accordance with the rotation of the rotor 1, rectangular-wave signals 27, 29 are fed from both operational amplifiers. Furthermore, inversion circuits 24-2, 24-3 output rectangular-wave signals 28 and 30.

The above-mentioned rectangular-wave signals 25, 27, and 29 have a phase difference of 120 degrees with each other, and to the contrary, rectangular-wave signals 26, 28, and 30 have a phase difference of 120 degrees with each other.

The logic circuit 19 has input terminals inputting the rectangular-wave signals 25 to 30 and output terminals 19a to 19f respectively outputting position detecting signals 31 to 36 (FIG. 7) in rectangular-wave form representing the rotational position of the rotor 1. The signal 31 and the signal 34 have a mutual phase difference of 180 degrees therebetween. The signal 32 and the signal 35 have a mutual phase difference of 180 degrees therebetween. The signal 33 and the signal 36 have a mutual phase difference of 180 degrees therebetwen. Furthermore, signals 31 to 33 have a phase difference of 120 degrees with respect to each other, and also signals 34 to 36 have a phase difference of 120 degrees with respect to each other.

Figure 6:
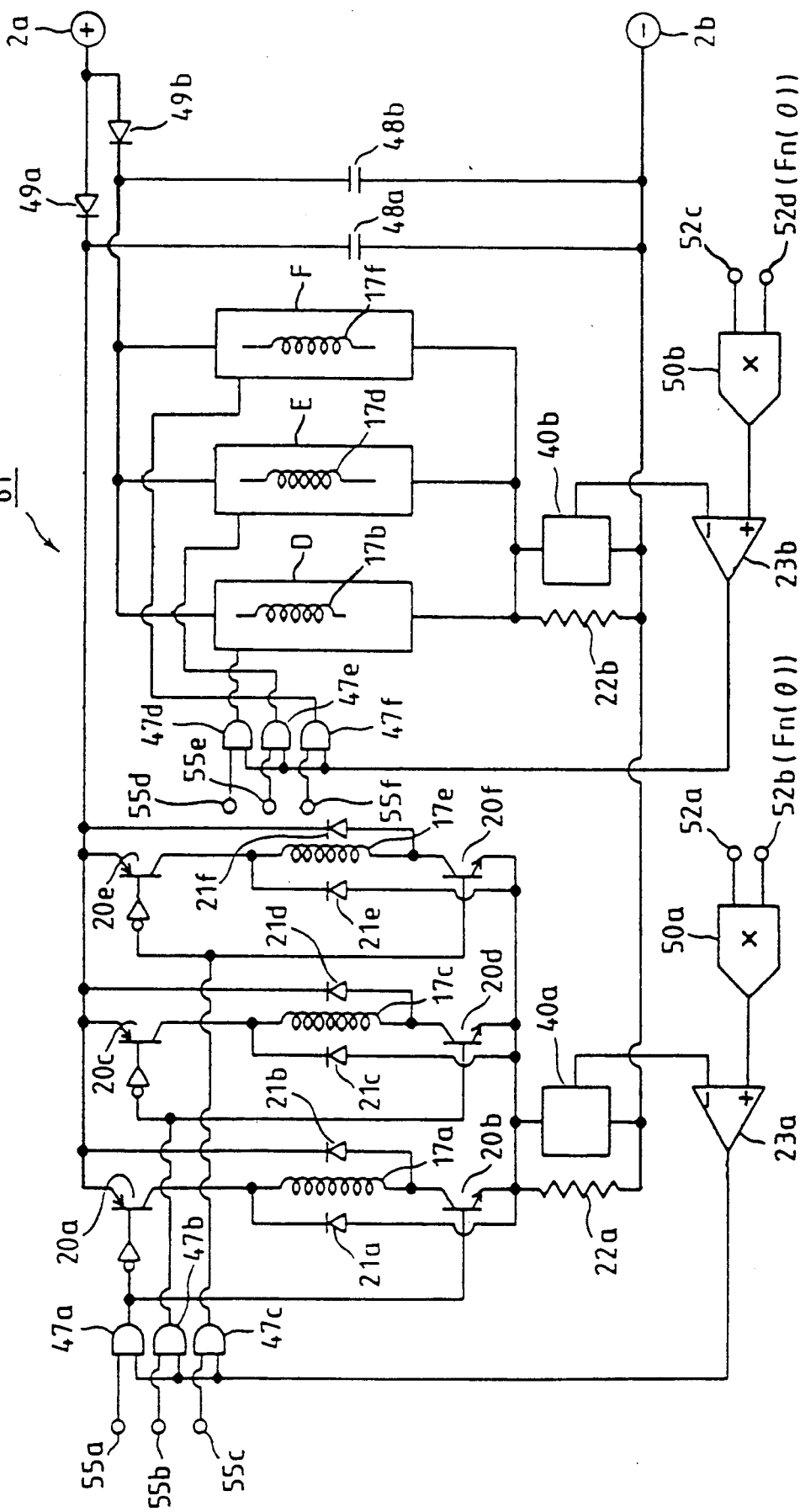
FIG. 6 is a circuit diagram of a supply current control circuit shown in FIG. 1.

Referring to FIG. 6, the current supply control circuit 61 for supplying or ceasing the exciting current to the exciting coils 17a to 17f of the armature 16 comprises AND circuits 47a to 47e each having one input terminal each connected through input terminals 55a to 55f to output terminals 19a to 19c, 19f, 19d, 19e of the position detecting device 62, a multiplication circuit 50a having two input terminals 52a and 52b to which a standard voltage K1 determining the command exciting current In and an output voltage Fn(i) from the D/A converter 59 of FIG. 1 are applied, another multiplication circuit 50b similar to the multiplication circuit 50a, and operational amplifiers 23a and 23b responding to outputs of the multiplication circuits 50a and 50b determining output torque of the motor and cooperating with the AND circuits 47a and 47e etc. to form a chopper circuit which is described later.

The AND circuits 47a to 47c have the other input terminals being connected to the output terminals of the operational amplifier 23a. The AND circuits 47a and 47c have respective output terminals connected through an inversion circuit to the bases of the transistors 20a, 20c, and 20e interposed between a diode 49a having an anode connected to a positive terminal 2a of a DC source and a respective one end of the exciting coils 17a, 17c, and 17e. (It is possible to use switching elements such as a power MOSFET, etc., instead of transistors.)

The other ends of the exciting coils 17a, 17c, and 17e are connected through transistors 20b, 20d, and 20f and resistance 22a to a negative terminal 2b of the DC source. A diode 21a is connected between a connecting point of the transistor 20b and the resistance 22a and a connecting point of exciting coil 17a and the transistor 20a. A diode 21c is connected between a connecting point of the transistor 20d and the resistance 22a and a connecting point of the exciting coil 17c and the transistor 20c. A diode 21e is connected between a connecting point of the transistor 20f and the resistance 22a and a connecting point of the exciting coil 17e and the transistor 20e. Further, a diode 21b is connected between a connecting point of the transistor 20a and the diode 49a and a connecting point of the exciting coil 17a and transistor 20b. a diode 21b is connected between a connecting point of the transistor 20c and the diode 49a and a connecting point of the exciting coil 17c and the transistor 20d. A diode 21f is connected between a connecting point of the transistor 20e and the diode 49a and a connecting point of the exciting coil 17e and the transistor 20f.

Regarding the exciting coils 17b, 17d, and 17f, there are provided components (shown as blocks D, E, and F in FIG. 6) corresponding to above-mentioned various circuit components relating to the exciting coils 17a, 17c, and 17e. Reference numerals 22b denotes a resistance corresponding to the resistance 22a.

Further, the current supply control circuit 61 includes an absolute value circuit 40a detecting a voltage drop in the resistance 22a connected to both ends of the resistance 22a; i.e. detecting the exciting current flowing through the exciting coils 17a, 17c, and 17e, and a similar absolute value circuit 40b connected to both ends of the resistance 22b. Output terminals of the absolute value circuits 40a and 40b are connected to negative input terminals of the operational amplifiers 23a and 23b, and output terminals of the multiplication circuits 50a and 50b are connected to a positive input terminal o the operational amplifier 23a. Reference numerals 48a and 48b denote capacitors.

In the current supply control circuit 61 as described above, when the output voltages of the multiplication circuits 50a and 50b exceed the output voltages of the absolute value circuits 40a and 40b and the AND circuits 47a to 47f are in gate open conditions by the H level output from the operational amplifier 23a and 23b, and further if an H level position detecting signal is applied on the input terminal 55a, the transistors 20a and 20b are activated to supply current to the exciting coil 17a. When an H level signal is applied to the input terminal 55b, the transistors 20c and 20d are activated to supply current to the exciting coil 17c. Further, when an H level signal is applied to the input terminal 55c, the transistors 20e and 20f are activated to supply current to the exciting coil 17e. If the input terminals 55d to 55f respectively receive an H level signal, corresponding two transistors in the block D to F are actuated to supply current to corresponding ones of the exciting coils 17b, 17d, and 17f.

Figure 8:
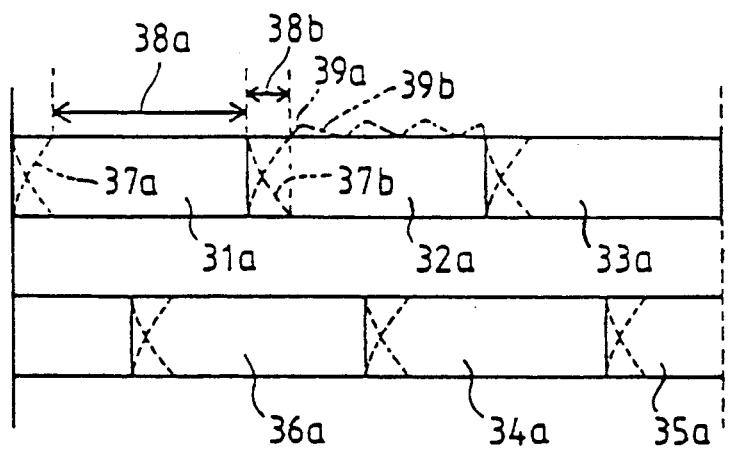
FIG. 8 is a timing chart showing the position detecting signal and the exciting current.

For example, when the position detecting signal 31a is applied to the input terminal 55a of the supply current control circuit 61, the exciting coil 17a is supplied current through the transistors 20a and 20b activated by the H level output fed from the AND circuit 47a which is in a gate open condition. As a result of this operation, as shown in FIG. 8, an exciting current 37a flowing through the exciting coil 17a is increased. Since the inductance of the exciting coil of the reluctance type motor 3 is large, building-up of the exciting current 37a becomes slow. To compensate this slow building-up of the exciting current 37a, output voltage of the DC source is increased.

Moreover, the continuing time period of the position detecting signal 31a becomes short as the rotational speed of the motor becomes high, therefore the output voltage of the DC source needs to be increased during high speed operation.

When the exciting current 37a exceeds the output voltage of the multiplication circuit 50a, the output of the operational amplifier 23a becomes an L level to deactivate the transistors 20a and 20b, and therefore the current supply to the exciting coil 17a is stopped. In this case, magnetic energy stored in the exciting coil 17a is discharged through the diodes 21a and 21b and the capacitor 48a, and an output voltage of the absolute value circuit 40a is lowered.

Then, the output of the operational amplifier is inverted to H level by virtue of hysteresis characteristic of the operational amplifier 23. If the exciting current 37a exceeds the output voltage of the multiplication circuit 50a again, the output of the operational amplifier is inverted to the L level. That is, a chopper action is effected in a section shown by an arrow 38a.

Furthermore, though the conventional reluctance type motor is affected to vary the chopper frequency by the inductance change in the exciting coil due to the change of generated magnetic flux amount of the magnetic pole, the reluctance type motor in accordance with the present embodiment wherein the chopper frequency is chiefly determined by the capacities of the capacitors 48a and 48b can suppress the change of chopper frequency, thereby providing a practical reluctance type motor.

When the position detecting signal 31a is deleted to deactivate the transistors 20a and 20b, the magnetic energy stored in the magnetic coil 17a is discharged along a path including the diode 21b, the capacitor 48a, the resistance 22a and the diode 21a. In contrast, the discharge of the magnetic energy to the DC source is prevented by the diode 49a. Consequently, a voltage of the capacitor 48a increases.

When the following position detecting signal 32a is applied to an input terminal 55b of the current supply control circuit 61, the transistors 20c and 20d are activated to initiate current supply to the exciting coil 17c since the AND circuit 47b is in a gate open condition by the H level output fed from the operational amplifier 23a caused by the output voltage drop of the absolute value circuit 40 at this timing. Thus the exciting current 39a (FIG. 8) flowing from the exciting coil 17c is increased. In a building-up section 38b of the exciting current 39a, current interacting to cancel the output torque of the motor generated by the exiting current 39a is generated in accordance with the magnetic energy discharge from the exciting coil 17a.

When the width of the section 38b exceeds an electrical angle of 30 degrees, a torque (i.e. counter torque) acting to oppose the motor output torque becomes remarkable. Since the width of the position detecting signal 32a becomes small when the motor is driven in a higher speed condition, the width of the section 38b must be reduced. Though the voltage of the DC source was increased to deal with this problem in the conventional art, such a counter torque suppression by increasing the voltage of the DC source is not so effective in the current supply control circuit 61 in accordance with present invention in which the diode 49a is equipped. However, the capacitor 48a is charged by the magnetic energy stored in the exciting coil 7 when the previous position detecting signal 31a disappeared, and the exciting current supplied to the exciting coil 17c is increased abruptly by this charging voltage.

Accordingly, without increasing the DC source voltage, it is possible to suppress the counter torque enough to allow the motor 3 to rotate at a higher speed. Furthermore, the motor output torque can be controlled independently based on the command voltage applied to the one of the input terminals 52a and 52c of the multiplication circuits 50a and 50b. Moreover, since the charging voltage of the capacitor 48a increases faster as its capacity becomes smaller, motor rotational speed and exciting current value are taken into consideration in determining the capacity of the capacitor 48a.

The exciting current 39b flowing through the exciting coil 17c is controlled as shown in FIG. 8 by the chopper action of the operational amplifier 23a and the AND circuit 47b, and steeply decreased upon the disappearance of the position detecting signal 32a.

Furthermore, when the next position detecting signal 33a is applied to the input terminal 55c of the supply current control circuit 61, current supply to the exciting coil 17e is carried out in the same way. As described above, the current supply to the exciting coils 17a, 17c, and 17e are successively and continuously performed (hereinafter, referred to as an A-phase current supply mode), and the motor output torque is generated.

In the same manner, in response to applications of the position detecting signals 36a, 34a, and 35a to the input terminals 55d, 55e, and 55f of the current supply control circuit 61, current supply to the exciting coils 17b, 17d, and 17f is carried out (hereinafter, referred to as a B-phase current supply mode). Successively and continuously generated position detecting signals 36a, 34a, and 35a have an electrical angle width of 120 degrees, and have a delayed phase of 60 degrees delayed against the corresponding one of the position detecting signals 31a to 33a.

In the same manner as the A-phase current supply mode, as indicated by the broken line in FIG. 8, exciting current is built-up in each of the exciting coils 17b, 17d, and 17f upon respective corresponding generations of the position detecting signals 36a, 34a, and 35a, and in turn, drops upon disappearance of these position detecting signals. Widths of the building-up of the exciting current and its last transition are restricted by the diode 49b and the capacitor 48b. Moreover, the exciting current is chopper-controlled by the capacitor 48b, the absolute value circuit 40b, the resistance 22b, the operational amplifier 23b, and the multiplication circuit 50b.

Figure 9:
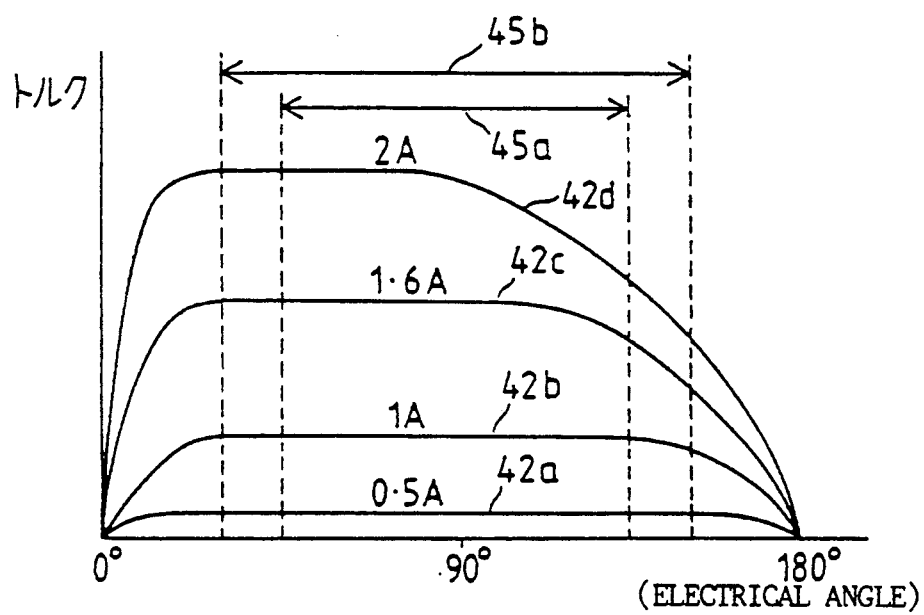
FIG. 9 is a graph showing the relationship between armature output torques and rotor rotational positions.

The fixation positions of the detecting coils 10a to 10c are adjusted in such a manner that the current supply sections of 120 degrees for the respective exciting coils 17a to 17f begin at the timing the rotor 1 has rotated an electrical angle of 30 degrees after one of the salient-poles 1a to 1g of the rotor 1 begins to face the corresponding one of the magnetic poles 16a to 16f in the A-phase and B-phase current supply modes. As a result of this adjustment, in the case that the exciting current correction by the torque ripple data in accordance with the present invention is not carried out, the output torque of the 120-degree section 45b occurs as shown in FIG. 9 in response to the current supply to the respective exciting coils. (Torque curves 42a to 42d in FIG. 9 corresponds to exciting currents of 0.5 ampere, 1.0 ampere, 1.6 ampere, and 2.0 ampere, respectively.)

Figure 10:
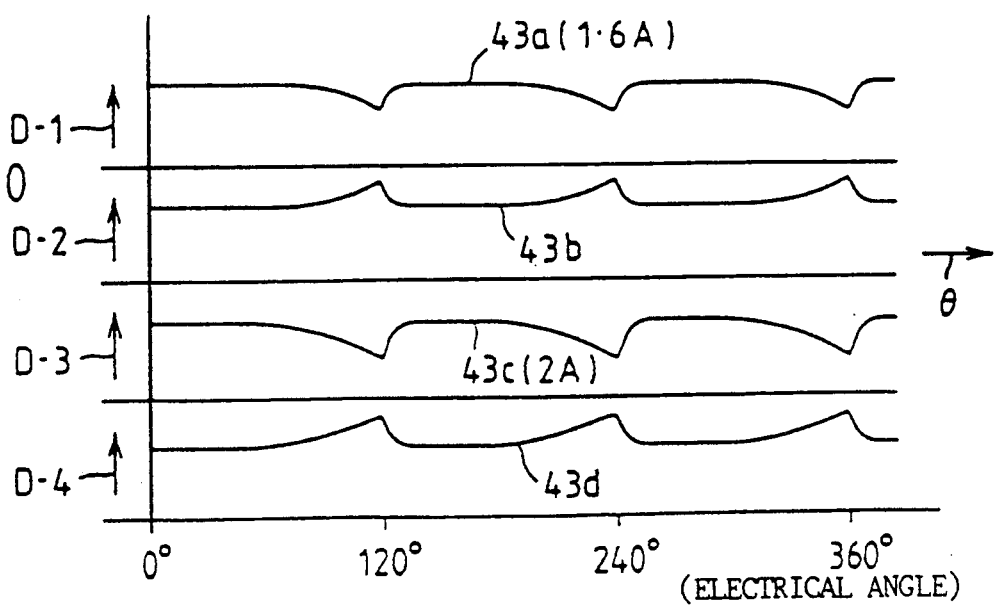
FIG. 10 is a graph showing the relationship between the armature output torque generated based on the command exciting current and the rotor rotational position and the relationship between the output of the multiplication circuit of FIG. 6 based on the corrected command exciting current and the rotor rotational position.

Therefore, with respect to the A-phase current supply mode, composite torques 43a and 43c are generated as exemplarily shown in FIG. 10 which takes torques on the ordinates D-1 and D-3 and rotor rotational positions on the abscissa 1. Torques—rotor rotational position curves vary on the basis of the exciting current such that the torque ripple increases as the exciting current increases. Curves 43a and 43c of FIG. 10 correspond to the exciting currents of 1.6 ampere and 2.0 ampere, respectively. Torques—rotor rotational position curves in the B-phase current supply mode have 60-degree delayed phases delaying against those of the A-phase current supply mode.

As described above, in a section from an electrical angle of 0 degree wherein the salient-pole begins to face the magnetic pole at an electrical angle of 180 degrees wherein the salient-pole completely faces the magnetic pole. If an output torque is generated in the central portion which is within the electrical angle of 120 degrees having relatively small torque ripples, it is possible to reduce the torque ripple to a certain degree without performing the correction of the command exciting current by the torque ripple data in accordance with the present invention. As described in detail later, however, the torque ripple can be greatly reduced by correcting the command exciting current in accordance with the torque ripple data.

While the current supply based on the A-phase and B-phase current supply modes is carried out for example in the exciting coils 17b and 17c, the magnetic poles 16b and 16c are magnetized so that the salient-poles 1b and 1c can be magnetically attracted to cause the rotor 1 to rotate in a direction of an arrow A-1 shown in FIG. 4. Subsequently, when the rotor 1 has rotated 30 degrees, current supply to the exciting coil 17b is terminated. To the contrary the current supply to the exciting coil 17d is initiated to attract the salient-pole 1d, thereby generating rotational torque. In such a manner, current supply mode is changed every time the rotor 1 rotates 60 degrees. That is, exciting polarity of the magnetic pole is cyclically alternated as follows: the magnetic poles 16b (N-pole) and 16c (S-pole) the magnetic poles 16c (S-pole) and 16d (N-pole) the magnetic poles 16d (N-pole), and 16e (S-pole), the magnetic poles 16e (S-pole), and 16f (N-pole), and the magnetic poles 16f (N-pole), and 16a (S-pole). Consequently, the rotor 1 is driven to rotate in a direction of an arrow A-1. During a driving operation of the motor 3, the torque ripple data Fn(i) is supplied from the D/A converter 59 of FIG. 1 to the current supply control circuit 61. This torque ripple data Fn(i) is applied to respective input terminals 52a, and 52c of the multiplication circuits 50a and 50b, in the supply current control circuit 61. These multiplication circuits 50a and 50b multiply the torque ripple data Fn(i) by a voltage signal K1 corresponding to the command exciting current applied to the other input terminal and, in turn, apply an output K1Fn(i) equal to the calculated multiplication result to the positive input terminals of the operational amplifiers 23a and 23b. Then, the exciting current is controlled to coincide with the output K1Fn(i) equal to the calculated multiplication result by the above-described chopper control action of the supply current control circuit 61. In other words, the command exciting current is corrected on the basis of the torque ripple data Fn(i), and the output of the multiplication circuit corresponds to the corrected command exciting current K1Fn(i)In.

With respect to the A-phase current supply mode, output torques 43b and 43d are generated as exemplarily shown in FIG. 10 which takes output voltages of the multiplication circuits 50a and 50b on the ordinates D-2 and D-4 and rotor rotational positions on the abscissa 1. Outputs of the multiplication circuit—rotor rotational positions curves vary on the basis of the exciting current. Curves 43b and 43d of FIG. 10 correspond to the exciting currents of 1.6 ampere and 2.0 ampere, respectively. A similar output of the multiplication circuit is generated in the B-phase current supply mode.

As shown in the torques—rotational positions curves 43a and 43c and the outputs of the multiplication circuit (corrected command exciting current)—rotational positions curves 43b and 43d in FIG. 10, the corrected command exciting current K1Fn(i)in acts to compensate the torque ripple. Consequently, the torque ripple is removed from the motor output torque, and a flat torque Tn (=KK1IN) can be obtained. That is, the torque ripple fn(i) comprised in the output torque Tn (=fn(i) In) occurring when the motor 3 is driven by the command exciting current in is removed.

Though the torque ripple data Fn(i) during one complete revolution of the rotor 1 of the motor 3 is stored in the ROM 51a, etc. in the above first embodiment, it is possible to store the torque ripple data for a rotor rotational region corresponding to an electrical angle of 180 degrees in the ROM 51a, etc. so as to be able to repeatedly read out the torque ripple data for the rotor rotational region corresponding to the electrical angle of 180 degrees during one complete revolution of the rotor 1. That is, as shown in FIG. 9, since torques expressed by the similar curves 42a, etc. are repeatedly generated at intervals of electrical angle of 180 degrees, an effect similar to that of the first embodiment can be obtained by repeatedly reading out the torque ripple data for the rotational region of the 180-degree electrical angle. Thus, memory means having smaller memory capacity can be used as the ROM 51a, etc.

Moreover, though the torque ripple data Fn(i), which is obtained by dividing the torque detector output Tn (=fn(i)In) by KIn by means of the division circuit 54, is stored in the ROM 51a etc. in writing the torque ripple data in the above first embodiment, it is possible to store the torque detector output Tn instead of the data Fn(i). in this case, it is possible to perform the data writing operation by using a data writing apparatus of FIG. 2 except the division circuit 54.

Further, there is provided a division circuit 60 (FIG. 1) which is provided between the D/A converter 59 and the supply current control circuit 61 in the driving system and has the same constitution as the division circuit 54. The output Tn of the D/A converter 59 is applied to one input terminal X of the division circuit 60 and the voltage Kin corresponding to the command exciting current is applied to the other input terminal Y of the division circuit 60. With this arrangement, a similar torque ripple data Fn(i) to the first embodiment can be output from the division circuit 60 to the supply current control circuit 61.

Hereinafter, the driving system in accordance with the second embodiment of the present invention will be explained.

This embodiment is chiefly different from the first embodiment in that this embodiment is applied to three-phase half-wave reluctance type motors, though the first embodiment is applied to a three-phase full-wave reluctance type motor. Referring to FIG. 11, the three-phase half-wave reluctance type motor comprises a rotor 1 forming eight salient-poles 1a to 1h, and an armature 16 forming six magnetic poles 16a to 16f. These magnetic poles 16a to 16f are coupled with the exciting coils 17a to 17f. The exciting coils 17a and 17d are connected with each other in series or in parallel. This connection is referred to as paired exciting coils K. The exciting coils 17b and 17e and exciting coils 17c and 17f are also connected in the same fashion. These connected components are referred to as paired exciting coils L and M, respectively.

The driving system further comprises the position detecting device 62 and the current supply control circuit 62. In the case that the position detecting device 62 shown in FIG. 5 is used as the position detecting device, it is noted that only the position detecting signals from the output terminals 19a to 19c of the position detecting device 62 can be utilized. Further, the current supply control circuit is formed by removing blocks D to F and circuit components relating to these blocks from the current supply control circuit of FIG. 6. The exciting coils 17a, 17c, and 17e are substituted by the paired coils K to M.

In the driving system with the above arrangement, when the position detecting signal is applied from the position detecting device to the Input terminal 55b of the supply current control circuit, the paired exciting coils L are supplied current. As a result, the magnetic poles 16b and 16f of the armature 16 are magnetized to magnetically attract the salient-poles 1b and 1f to cause the rotor 1 to rotate in the direction of an arrow A-1 in FIG. 11. Subsequently, if the rotor 1 rotates 120 degrees, the current supply to the paired coils L is terminated and the current supply to the paired coils M is initiated. And, if the rotor 1 further rotates 120 degrees, the current supply to the paired coils M is terminated and the current supply to the paired coils K is initiated. In this manner, the current supply mode is cyclically alternated at intervals of 120-degree revolutions as follows; the paired exciting coils K, the paired exciting coils L, the paired exciting coils M. As a result, the paired coils K to M are successively and continuously supplied current to cause the rotor to generate output torque. In this case, two magnetic poles positioned symmetrically are, as shown in FIG. 11, magnetized. Since the excited two magnetic poles are always magnetized to have opposite polarities, leaking magnetic fluxes passing non-excited magnetic poles become opposite directions. Thus, the generation of counter torque is prevented. And, in the same manner as the first embodiment, the torque ripple of the motor output torque is removed during the driving operation of the motor.

Referring now to FIGS. 12 to 17, the driving system in accordance with the third embodiment of the present invention will be explained hereinafter.

This embodiment is chiefly different from the first and second embodiments in that this embodiment is applied to two-phase reluctance type motors, though the first and second embodiments are applied to three-phase reluctance type motor.

The two-phase reluctance type motor, as shown in FIG. 12, comprises a rotor 1 having ten salient-poles 1a to 1j disposed at regular Intervals, and an armature 16 having eight magnetic poles 16a to 16h disposed at regular intervals each coupled with respective exciting coils 17a and to 17h. The exciting coils 17a, 17e are connected with each other in series or in parallel. This connection is referred to as a paired exciting coil G. The exciting coils 17b and 17f, the exciting coils 17c and 17g, and the exciting coils 17d and 17h are also connected in the same fashion. These connected components are referred to as paired exciting coils M, H, and S, respectively.

Figure 13:
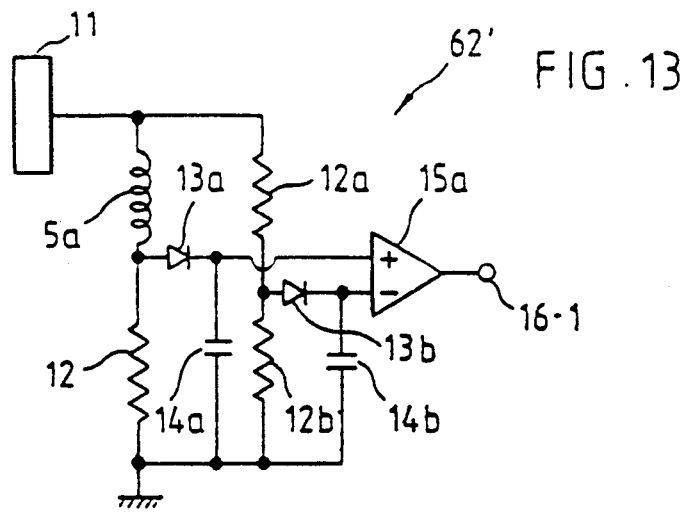
FIG. 13 is a partial circuit diagram showing a position detecting device of a driving system of the third embodiment.

The driving system of the present embodiment comprises the position detecting device 62' shown in FIG. 13 having basically the same constitution as the one shown in FIG. 5. FIG. 13 shows corresponding portions relating only to the detecting coil 5a (FIG. 12) in the composition of the position detecting device 62', but also includes similar components relating to the detecting coil 5b and inversion circuits respectively corresponding to inversion circuits 24-1 and 24-2 of FIG. 5.

Both detecting coils 5a and 5b are disposed to be separated from each other by an electrical angle of 90 degrees. By the reason described later, both the detecting coils 5a and 5b are disposed to produce position detecting signals when the rotor rotates 45 degrees after the salient-poles enter into magnetic poles. As described above, the basic constitution of the position detecting device is the same as that shown in FIG. 5, therefore its detail explanation is omitted here.

Figure 15:
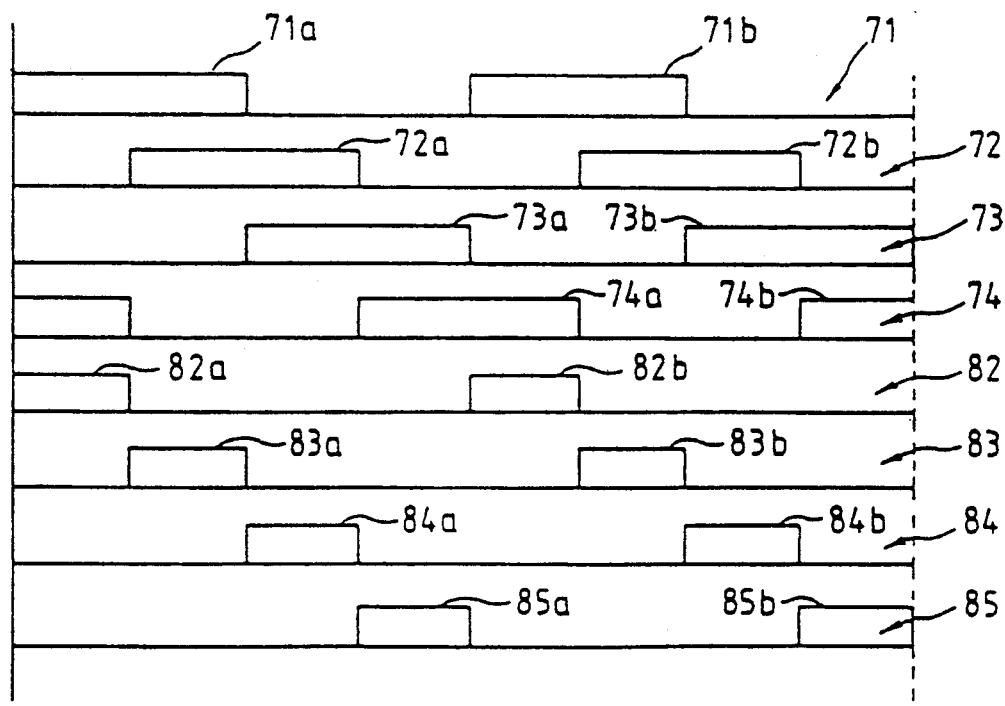
FIG. 15 is a timing chart showing rectangular wave signals and position detecting signals generated by the position detecting device of FIG. 13.

As shown in FIG. 15, in accordance with the position detecting device 62', outputs 71 of the detecting coil 5a sent out from the output terminal 16-1, outputs 72 of the detecting coil 5b and outputs 73 and 74 which are obtained by inverting the outputs 71 and 72 in the inversion circuits are generated. The width of each output is 180 degrees.

Figure 14:
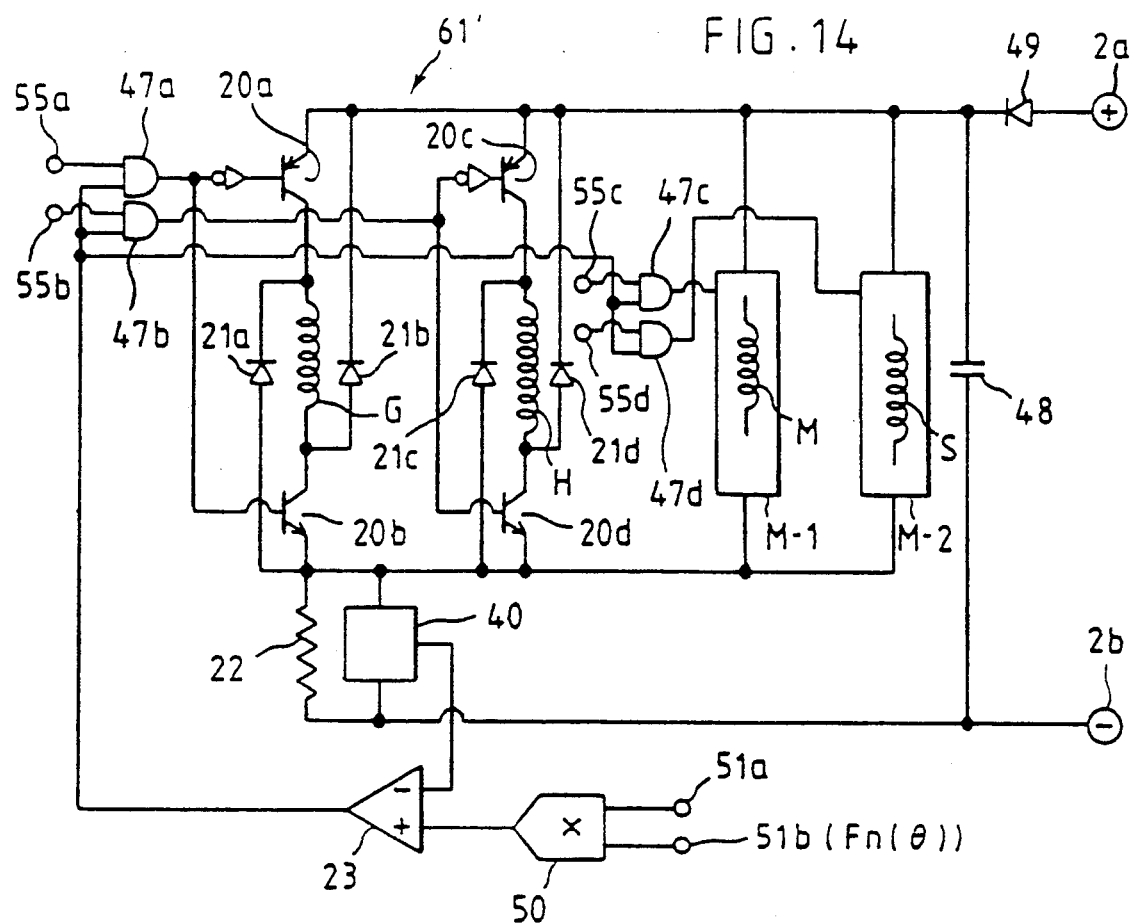
FIG. 14 is a circuit diagram showing a supply current control circuit of the driving system of the third embodiment.

The driving system further comprises the supply current control circuit 61' of FIG. 14. This current supply control circuit 61' is different from the circuit 61 of FIG. 6, which controls the current supply to six exciting coils in response to six kinds of position detecting signals, in that the supply current control circuit 61' controls the current supply to four paired-coils in response to four kinds of position detecting signals. However, its detailed explanation is omitted here since the current supply control circuit 61' has basically the same constitution as the one of FIG. 6. In FIG. 14, components corresponding to the components of FIG. 6 are suffixed by similar reference numerals. Block circuits M-1 and M-2 relate to the paired exciting coils M and S, and include circuit components similar to the circuit components relating to the paired exciting coils G and H.

Figure 16:
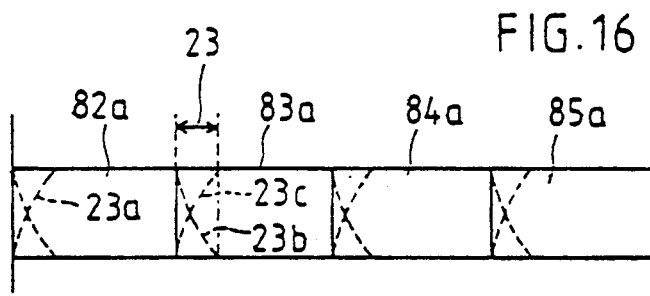
FIG. 16 is a timing chart showing a series of position detecting signals and exciting currents.

Referring now to FIGS. 15 and 16, during the driving operation of the motor, an AND signal 82 of the output 71 of the detecting coil 5a and the inversion output 74 of the detecting coil 5b, an AND signal 84 of the output 72 of the detecting coil 5b and the inversion output 74 of the detecting coil 5a, an AND signal 83 of the outputs 71 and 72, and an AND signal 85 of the outputs 73 and 74 are respectively applied to the input terminals 55a to 55d of the current supply control circuit 61'.

The current supply control circuit 61' controls the current supply to the paired exciting coils G, H, M, and S in response to the position detecting signals 82 to 85. The current supply to the paired exciting coils G, M, H, and S is initiated when the rotor has rotated 45 degrees from the rotational position that the salient-poles begin to enter into the magnetic poles, and is done during a section of an electrical width of 90 degrees in this order. For example, current supply to the paired coils M induces attraction of the salient-poles 1b and 1g to cause the rotor 1 to rotate in the direction of the arrow A-1 in FIG. 12. When the rotor 1 rotates 90 degrees, current supply to the paired exciting coils M is terminated and the current supply to the paired exciting coils H is initiated to generate torque by the salient-poles 1c and 1h.

When the position detecting signal 82a is applied to the input terminal 55a of the supply current circuit 61', the transistors 20a and 20b are activated to initiate the current supply to the paired exciting coils G. And, the exciting current 23a (FIG. 16) is supplied to the paired exciting coils G to cause a voltage drop in the resistance 22. Then, if the voltage applied from the absolute value circuit 40 to the negative input terminal of the operational amplifier 23 exceeds the output voltage of the multiplication circuit 50, an output of the operational amplifier 23 becomes L level to control the AND circuit 47a in a gate open condition, and therefore, the transistors 20a, 20b are deactivated. In this case, magnetic energy stored in the paired exciting coils G is discharged through the diodes 21a and 21b to the capacitor 48, therefore the capacitor 48 is charged.

After that, when the exciting current is reduced, an operational amplifier output turns to H level due to hysteresis characteristic of the operational amplifier 23. And, the transistors 20a and 20b are activated to increase the exciting current. The chopper action is effected in this manner, and the exciting current corresponding to the output voltage of the multiplication circuit 50 is obtained.

When the transistors 20a and 20b are deactivated upon disappearance of the position detecting signal 82a, magnetic energy stored in the paired exciting coils G is returned through the diodes 21a and 21b to the capacitor 48, and rapidly disappears as shown by the curve 23b in FIG. 16. Since the diode 49 is provided at the DC source side, the magnetic energy stored in the paired exciting coils M does not return to the DC source side, but is transferred to the magnetic energy in the paired exciting coils M. As a result, it becomes possible to shorten the last transition width 23 of the exciting current 23b and the building-up width 23 of the exciting current 23c which is described. With this, the torque reduction and the generation of counter torque are suppressed, and the motor can be driven at a higher speed. Moreover, the section width 23 is changeable based on the capacity of the capacitor 48 however. It is preferable to change the section width 23 on the basis of the motor rotational speed.

The next position detecting signal 83a is applied to the input terminal 55c of the current supply control circuit, and current is applied to the paired exciting coils M. Subsequently, the exciting current 23c is increased. After that, when the exciting current 23c reaches a setting value, the operational amplifier 23 responding to the voltage drop of the resistance 22 and the output voltage of the multiplication circuit 50 cooperates with the capacitor 47 to perform chopper control. Thus the exciting current is maintained at the setting value. The exciting current is abruptly reduced upon the disappearance of the position detecting signal 83a.

Further, current supply control is carried out in the paired exciting coils H and S in response to the position detecting signals 84a and 85a. As a result, the current supply to the paired exciting coils G, M, H, and S is carried out in this order in the current supply sections each of which has a 90-degree width and continuous with each other. Thus, one-way torque is generated to cause the rotor 1 to rotate in a one-way direction. The current supply section with respect to each of the paired exciting coils is shown as a reference numeral 45a in FIG. 9. Since the current supply to each paired exciting coils is carried out in this manner in the 90-degree width section corresponding to the region wherein the maximum torque occurs, operational efficiency of the motor is increased.

Figure 17:
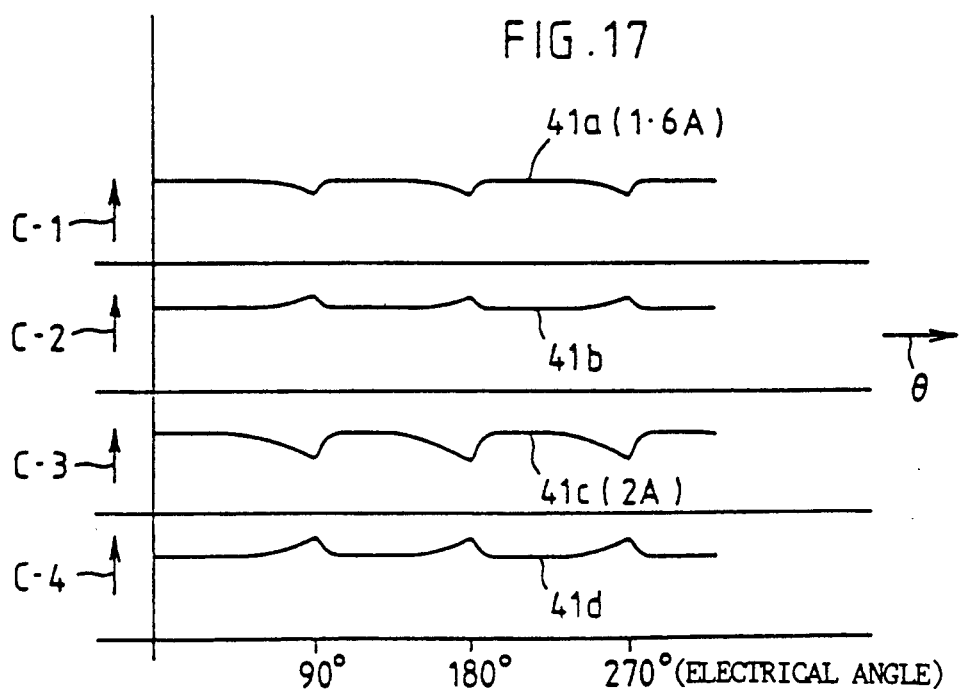
FIG. 17 is a graph showing torque curves and outputs of a multiplication circuit as a function of a rotor rotational position.

Furthermore, as is apparent from FIG. 9, in the case that the exciting current correction in accordance with the present invention is not carried out, the shape of the torque-rotational angle curve varies based on the exciting current, and the torque ripple increases as the exciting current increases. FIG. 17 shows composite torque curves 41a and 41c corresponding to the exciting currents of 1.6 amperes and 2.0 amperes respectively. In FIG. 17, arrows C-1 and C-3 represent torques and an arrow 1 represents a rotor rotational angle. Even in the composite torque curve, the torque ripple increases as the exciting current increases.

Though the detailed explanation is omitted, the driving system of the present embodiment effects the torque ripple removal action in the same way as the first or the second embodiments does. Furthermore, as shown in FIG. 9, the current supply section 45a of the present embodiment, which is applied to two-phase motors, is shorter than the current supply section 45b of the first and second embodiments applied for three-phase motors. Also, the torque ripple generating in the current supply section 45a becomes smaller than that of the current supply section 45b. Accordingly, torque ripple removal in this embodiment can be carried out easily compared with the first and second embodiments. Moreover, since the current supply section is short, a memory means with relatively small memory capacity can be used as the ROM 51a, etc., which is associated in the driving system.

FIG. 17 shows the multiplication circuit output voltages 41b and 41d in the case that the torque ripple voltages Fn(i) corresponding to the exciting currents of 1.6 amperes, and 2.0 amperes are fed to the torque ripple data input terminal of the multiplication circuit 50 in the current supply control circuit. In FIG. 17, arrows C-2 and C-4 represent multiplication circuit output voltages. As apparent from FIG. 17, the multiplication circuit output voltage 41b, 41d interact to cancel the fluctuation of the torques 41a and 41c occurring in the case that the torque ripple compensation of the present invention is not carried out. As a result, the ripple component of the motor output torque is removed, and a motor having a flat torque characteristic is thus obtained.

Hereinafter, a driving system in accordance with a fourth embodiment of the present invention is explained in detail.

This embodiment is chiefly different from the first to third embodiments which utilize the electrically prestored torque ripple data. This embodiment uses means (described later) for mechanically memorizing the torque ripple data.

The driving system controls an actuation of any one of various motors including three-phase full-wave reluctance type motors, three-phase half-wave reluctance type motors, and two-phase reluctance type motors which are control subjects in the first to third embodiments, and comprises a position detecting device (not shown) similar to the above-described position detecting device 62 or 62' and a current supply control circuit (not shown) similar to the above-described supply current control circuit 61 or 61'. On the other hand, the driving system comprises later-described components shown in FIGS. 18 to 20 instead of components 8, 8a, 57, 51, 51a to 51e, 59, 65, and 18a shown in FIG. 1.

Figure 18:
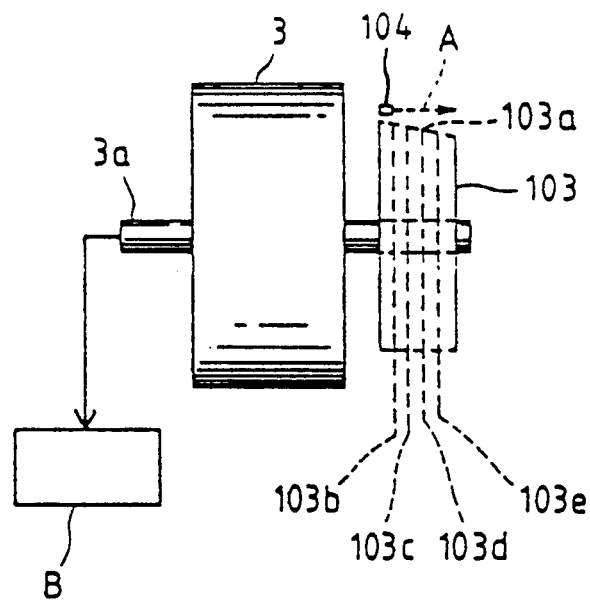
FIG. 18 is a schematic side view showing an essential part of a driving system in accordance with a fourth embodiment of the present invention.

Referring to FIG. 18, the driving system comprises a rotational body 103 fixed on the other end of the rotational shaft 3a of the motor 3 having one end connected to the load B and synchronously rotatable with a rotor (described later) of the motor 3. The rotational body 103 is for example made of a conductor such as aluminum or mild steel, and has an outer peripheral surface divided Into a plurality of (for example, 5) axial regions 103a to 103e.

Each of the axial regions 103a to 103e of the rotational body 103 includes a physical value (for example, a distance between the rotational shaft 3a and the outer peripheral surface) corresponding to the torque ripple data Fn(i). This torque ripple data Fn(i) is a function of the corresponding one of a plurality of command current values In and the rotational position of the rotational body; i.e. rotor rotational position i, and is calculated as described later. That is, a radius of the rotational body 103 varies stepwisely or continuously in an axial direction and a circumferential direction of the rotational body 103 in accordance with the torque ripple data Fn(i).

To obtain the rotational body 103 which radius varies in the axial direction and the circumferential direction based on the torque ripple data Fn(i)n, while the motor 3 is driven by the exciting current In which belongs to the exciting current causing, for example, less than half of the rated output torque of the motor 3 and corresponds to each of the axial regions 103a to 103e of the rotational body 3, the motor output torque Tn(=fn(i)In) varying in accordance with the rotor rotational position i is measured.

The output torque Tn includes the torque ripple corresponding to the function fn(i). Subsequently, the measured torque Tn is divided by the exciting current In, and further the torque ripple data Fn(i) is calculated by dividing a constant value K by the obtained divided result fn(i). Finally, the rotational body 103 is obtained by cutting a rotational body material according to the torque ripple data Fn(i).

The driving system includes a physical value detector such as a distance sensor having a detecting portion disposed shiftable in an axial direction of the rotational body 103 so as to face any one of the axial regions 103a to 103e on the outer peripheral surface of the rotational body, and a servo device positioning the detecting portion of the distance sensor so that the detection portion of the distance sensor can face to the one of the axial regions 103a to 103e corresponding command exciting current.

Figure 19:
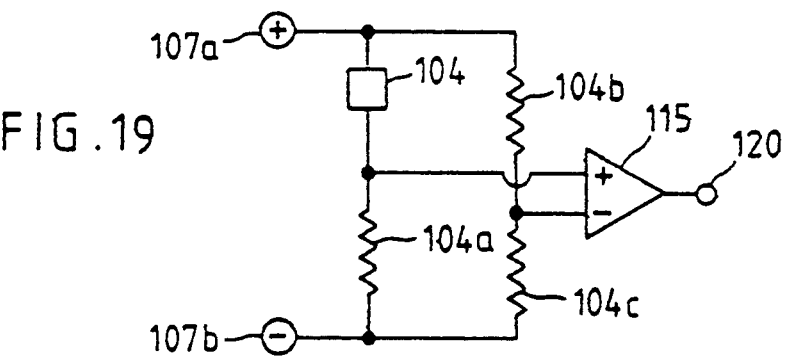
FIG. 19 is a circuit diagram showing a distance sensor of the driving system of the fourth embodiment of the present invention.

Referring to FIGS. 18 and 19, the distance sensor includes a bridge circuit consisting of an approximately 20-turn coil 104 as a detecting portion and resistances 104a to 104c, and an operational amplifier 115. The bridge circuit has input terminals 107a and 107b being applied a constant wave height voltage having approximately 1 MHz fed from an oscillator (not shown). The distance sensor is formed to send out from the output terminal 120 an output voltage proportional to the distance between the coil 104 and the outer, peripheral surface of the rotational body 103. The smaller the distance between the coil 104 and the rotational body 103 is, the larger the sensor output voltage becomes. Because, impedance of the coil 104 is reduced by eddy current loss and hysteresis loss to increase voltage drop in the resistance 104a. Namely, the sensor output voltage corresponds to the torque ripple data Fn(i).

Figure 20:
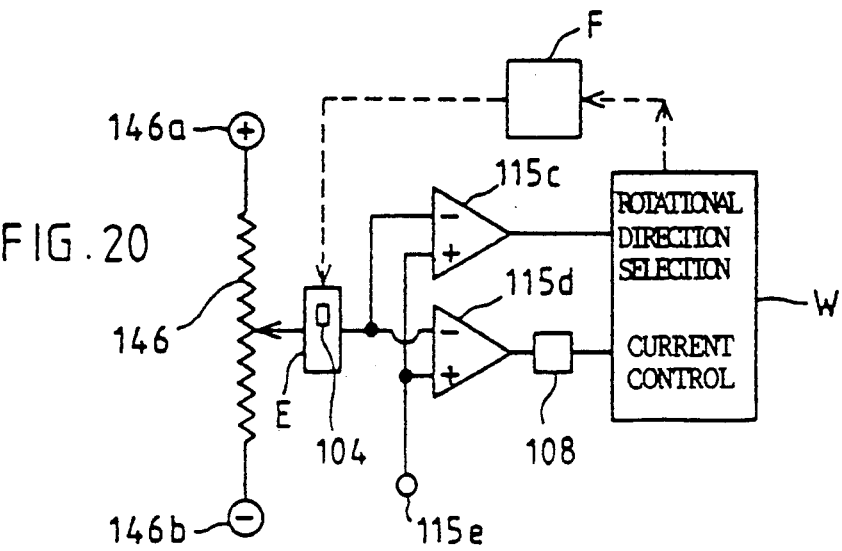
FIG. 20 is a circuit diagram showing a servo device of the driving system in accordance with the fourth embodiment of the present invention.

Referring to FIG. 20, the servo device positioning the coil 104 with respect to the rotational body 103 comprises a casing E accommodating the coil 104 and connected through a speed reduction unit F to a DC motor in a block W. The casing E is supported shiftably with respect to the rotational body and a sliding type resistance 146 both ends of which are connected to a positive terminal and a negative terminals 146a and 146b of a constant voltage source. The casing E has a sliding contact shiftable along the resistance 146.

The servo device comprises operational amplifiers 115c and 115d each having a positive input terminal inputting a voltage corresponding to the command exciting current through the terminal 115e and a negative input terminal connected to the sliding contact, a rectifier circuit 108, a current control circuit controlling an armature current of the DC motor, and a rotational direction selecting circuit for causing the DC motor to rotate in a normal direction or in an opposite direction. The block W includes the current control circuit and the rotational direction selecting circuit.

The servo device positions the coil 104 to face one of the axial regions 103a to 103e of the rotational body 103 which corresponds to the command exciting current value. That is, if an applied voltage to the terminal 115e is increased in accordance with the increase of command exciting current value, an output of the operational amplifier 115c increases to cause the DC motor in the servo device to rotate and an output of the operational amplifier 115d increases to induce increase of the armature current in the DC motor.

Consequently, the coil 104 shifts in a direction of an arrow A in FIG. 18. This shift movement of the coil 104 increases a voltage applied through the sliding contact to the negative Input terminal of the operational amplifier 115d, and the armature current of the DC motor decreases. Then if the coil 104 is, for example, positioned to face the axial region 103d of the rotational body which corresponds to the command exciting current, the shift movement of the coil ceases and the coil is held at that position.

During the driving operation of the motor 3, a distance between the coil 104 and the outer peripheral surface of the rotational body which corresponds to the torque ripple data Fn(i) is measured by the distance sensor positioned to face the axial region of the rotational body which corresponds to the command exciting current. A sensor output voltage corresponding to the torque ripple data Fn(i) is applied from the sensor output terminal 120 to, for example, one of the input terminals 52b and 52d of the multiplication circuits 50a and 50b in the current supply control circuit 61 shown in FIG. 6. Though the detailed explanation is omitted here, as a result of application a distance sensor output to the current supply control circuit, torque ripple removal action is effected in the same way as the first to the third embodiments.

In the fourth embodiment, though the rotational body 103 is formed on the outer peripheral surface thereof having a concave-convex pattern corresponding to the torque ripple data Fn(i), it is preferable to form the torque ripple function fn(i) instead of the above torque ripple data Fn(i). In this case, the torque ripple data Fn(i) (=K1/K2fn(i)) is calculated by an arithmetic circuit (not shown) consisting of a division circuit or multiplication circuit inputting an output signal K1fn(i) from the distance sensor 104 (K1, K2 are constants). Then, the exciting current is chopper-controlled to be InFn(i) by the current supply control circuit inputting the output of the arithmetic circuit. As a result, it becomes possible to obtain an output torque Tn (=InFn(i)fn(i)=K2In/K1) having no torque ripple component.

What is claimed is:

1. A driving system for controlling actuation of a reluctance type motor with a rotor and an armature having exciting coils, comprising:
    a position detecting device, operatively connected to the rotor, for generating a position detecting signal representing an actual rotational position of the rotor;
    a division circuit for receiving torque data from the reluctance type motor and a voltage proportional to a command exciting current, dividing the torque data by the voltage proportional to the command exciting current and outputting torque ripple data;
    a memory device pre-memorizing the torque ripple data as a function of the command exciting current and a rotor rotational position; and
    a current supply control circuit, operatively connected to the exciting coils, said position detecting device and said memory device, for supplying to each one of the exciting coils an exciting current corresponding to a corrected command exciting current corrected by the torque ripple data read out from said memory device on the basis of the position detecting signal and the command exciting current, said current supply control circuit including:
        a multiplication circuit, receiving the torque ripple data and the command exciting current, multiplying the torque ripple data with the command exciting current and outputting a corrected command exciting current.

2. A driving system in accordance with claim 1, wherein said position detecting device performs position detection in a predetermined rotational section of the rotor to generate pulse signals including a n origin pulse signal, and further comprising data readout means for reading out the torque ripple data from said memory device in response to the pulse signal.

3. A driving system in accordance with claim 1, wherein said current supply control circuit performs chopper control to change the exciting current flowing through the exciting coils to be a value corresponding to the corrected command exciting current.

4. A driving system in accordance with claim 2, wherein said predetermined rotational section of the rotor corresponds to one complete revolution of the rotor.

5. A driving system in accordance with claim 2, wherein said predetermined rotational section of the rotor corresponds to one cycle of periodic changes of the output torque of the motor.

6. A driving system in accordance with claim 1, wherein said memory device stores torque ripple data produced, based on actual output values of the motor, at a plurality of rotor rotational positions belonging to a predetermined rotational section of the rotor which are successively measured during a driving operation of the reluctance type motor controlled in response to each of a plurality of command exciting current values.

7. A driving system in accordance with claim 6, wherein said memory device stores torque ripple data proportional to the actual output torque value.

8. A driving system in accordance with claim 6, wherein said memory device stores torque ripple data reversely-proportional to the actual output torque value.

9. A driving system for controlling actuation of a reluctance type motor having a rotor and having an armature having exciting coils, comprising:
    a position detecting device generating a position detecting signal representing an actual rotational position of the rotor;
    a rotational body disposed synchronously rotatable together with the rotor and having an output peripheral surface comprising a plurality of axial regions each having physical values respectively corresponding to torque ripple data as a function of a corresponding one of a plurality of command exciting current values and a rotor rotational position;

a physical value detector having a detecting portion disposed shiftable along an axial direction of said rotational body so as to be able to face to any one of said plurality of axial regions on the outer peripheral surface of said rotational body;

a servo device for positioning said detecting portion so that said detecting portion faces one of said plurality of axial regions on the outer peripheral surface of said rotational body which corresponds to the command exciting current; and a current supply control circuit for supplying each exciting coil with an exciting current corresponding to the command exciting current corrected by the torque ripple data corresponding to a physical value detected by said physical value detector in which said detecting portion is thus positioned, said current supply control circuit including:

a multiplication circuit receiving the torque ripple data and the command exciting current and multiplying the torque ripple data with the command exciting current and outputting a corrected command exciting current.

10. A driving system in accordance with claim 9, wherein said rotational body has a radius serving as said physical value which varies in a circumferential direction on the basis of the torque ripple data in said axial region.

11. A driving system in accordance with claim 9, wherein said current supply control circuit performs a chopper control to change exciting current flowing through said exciting coil to be a value corresponding to said corrected command exciting current.

12. A driving system in accordance with claim 9, wherein said supply current circuit restricts current supply to each of said exciting coils to only a central portion of a rotor rotational section at which the motor can generate output torque in response to the current supply to each of said exciting coils.

13. A driving system in accordance with claim 9, wherein said outer peripheral surface of the rotational body comprises a physical value corresponding to torque ripple data produced based on actual output torque values of the motor at a plurality of rotor rotational positions belonging to a predetermined rotational section of the rotor which are successively measured during driving operation of the reluctance type motor controlled in response to each of a plurality of command exciting current values.

14. A driving system in accordance with claim 13, wherein the rotational body is formed to have the outer peripheral surface comprising a physical value corresponding to torque ripple data proportional to said actual output torque value.

15. A driving system in accordance with claim 13, wherein the rotational body is formed to have the outer peripheral surface comprising a physical value corresponding to torque ripple data reverse-proportional to said actual output torque value.

* * * * *

UNITED STATES PATENT AND TRADEMARK OFFICE
CERTIFICATE OF CORRECTION

PATENT NO. : 5,319,297

DATED : June 7, 1994

INVENTOR(S) : Itsuki BAHN

It is certified that error appears in the above-indentified patent and that said Letters Patent is hereby corrected as shown below:

Column 1, line 58, after "ripple" insert --.--;

Column 4, line 63, delete "constituted".

Column 6, line 59, change "5 mm" to --5mm--.

Column 7, line 12, change "o" to --of--;

line 27, after "of" (first occurrence) insert --the-- and change "consist" to --consists--;

line 52, change "channel to --change--;

line 54, change "25a, 25b" to -25a and 25b--;

line 59, delete ","; and line 63, after "29a" insert --,--.

Column 8, line 24, delete "each";

line 35, change "and" to --to--; and line 39, change "and" to --to--.

UNITED STATES PATENT AND TRADEMARK OFFICE
CERTIFICATE OF CORRECTION

PATENT NO. : 5,319,297
DATED : June 7, 1994
INVENTOR(S) : Itsuki BAHN

It is certified that error appears in the above-indentified patent and that said Letters Patent is hereby corrected as shown below:

Column 9, line 7, change "numerals" to --numeral--;

line 20, change "o" to --of--; and line 27, change "amplifier" to --amplifiers--.

Column 10, line 37, change "exiting" to --exciting--.

Column 11, line 57, change "1" to --i--.

Column 12, line 25, change ":" to --;--;

line 26, after "(S-pole)" insert --,--;

line 27, after "(N-pole)" delete ",";

line 28, after "(N-pole)" delete ",";

line 29, after "(S-pole)" delete ",";

line 30, after "(N-pole) delete ",";

line 36, after "52a" delete ",";

line 37, after "50b" delete ",";

line 56, change "1" to --i--; and line 67, change "K1fn(i)in" to --K1Fn(i)In--.

UNITED STATES PATENT AND TRADEMARK OFFICE
CERTIFICATE OF CORRECTION

PATENT NO. : 5,319,297
DATED : June 7, 1994
INVENTOR(S) : Itsuki BAHN

It is certified that error appears in the above-indentified patent and that said Letters Patent is hereby corrected as shown below:

Column 13, line 5, change "in" to --In--;

line 29, change "in" to --In--;

line 38, change "Kin" to --KIn--; and line 65, change "62" to --61--.

Column 14, line 9, change "Input" to --input--;

line 46, change "Intervals" to --intervals--; and line 49, delete "and" and change "17a, 17e" to --17a and 17e--.

Column 15, line 10, after "56" insert --,--; and line 53, change "$_{Initi}$" to --initi---.

Column 16, line 6, delete "And," and change "the" to

--The--;

line 27, after "48" insert --,--, after "however"

insert --,-- and change "It" to --it--; and line 64, after "amperes" insert --,--. (second occurrence)

UNITED STATES PATENT AND TRADEMARK OFFICE
CERTIFICATE OF CORRECTION

PATENT NO. : 5,319,297

DATED : June 7, 1994

INVENTOR(S) : Itsuki BAHN

It is certified that error appears in the above-indentified patent and that said Letters Patent is hereby corrected as shown below:

Column 17, line 21, delete ",";

line 26, change "voltage" to --voltages-- and change "41b, 41d" to --41b and 41d--; and line 60, change "Into" to --into--.

Column 18, line 32, delete "to the";

line 33, after "corresponding" insert --to the--;

line 44, delete ","; and line 59, change "terminals" to --terminal--.

Column 19, line 18, change "Input" to --input--;

line 20, after "Then" insert --,--; and line 37, after "application" insert --of--.

UNITED STATES PATENT AND TRADEMARK OFFICE
CERTIFICATE OF CORRECTION

PATENT NO. : 5,319,297
DATED : June 7, 1994
INVENTOR(S) : Itsuki Bahn

It is certified that error appears in the above-indentified patent and that said Letters Patent is hereby corrected as shown below:

Column 20, line 24, change "a n" to --an--.

Signed and Sealed this

Third Day of January, 1995

Attest:

BRUCE LEHMAN

Attesting Officer

Commissioner of Patents and Trademarks